United States Patent [19]
Reeves

[11] 3,797,857
[45] Mar. 19, 1974

[54] TRIM STRIPS FOR VEHICLE DOOR OPENINGS

[75] Inventor: John Vincent Reeves, Coventry, England

[73] Assignee: Chrysler United Kingdom Limited, London, England

[22] Filed: June 16, 1972

[21] Appl. No.: 263,445

[30] Foreign Application Priority Data
July 13, 1971  Great Britain.................... 32833/71

[52] U.S. Cl............................. 280/150 B, 296/28 R
[51] Int. Cl.............................................. B60r 13/02
[58] Field of Search..... 280/150 B; 296/28 R, 84 K, 296/146

[56] References Cited
UNITED STATES PATENTS
3,539,201  11/1970  Loew.............................. 280/150 B
3,195,948  7/1965  Sturtevant et al............. 296/146 X FOREIGN PATENTS OR APPLICATIONS
1,053,360  12/1966  Great Britain.................. 280/150 B Primary Examiner—Stanley H. Tollberg
Assistant Examiner—James M. Slattery
Attorney, Agent, or Firm—Mawhinney & Mawhinney

[57] ABSTRACT

A trim strip for a vehicle door opening has a U-shaped channel to fit around a flange around a door opening. The channel has, on one side, a resilient sealing member to engage a vehicle door and, on the opposite side, an elongate resilient pad secured along the channel by a snap-on fastener to protect a vehicle occupant from injury on the flange.

6 Claims, 5 Drawing Figures

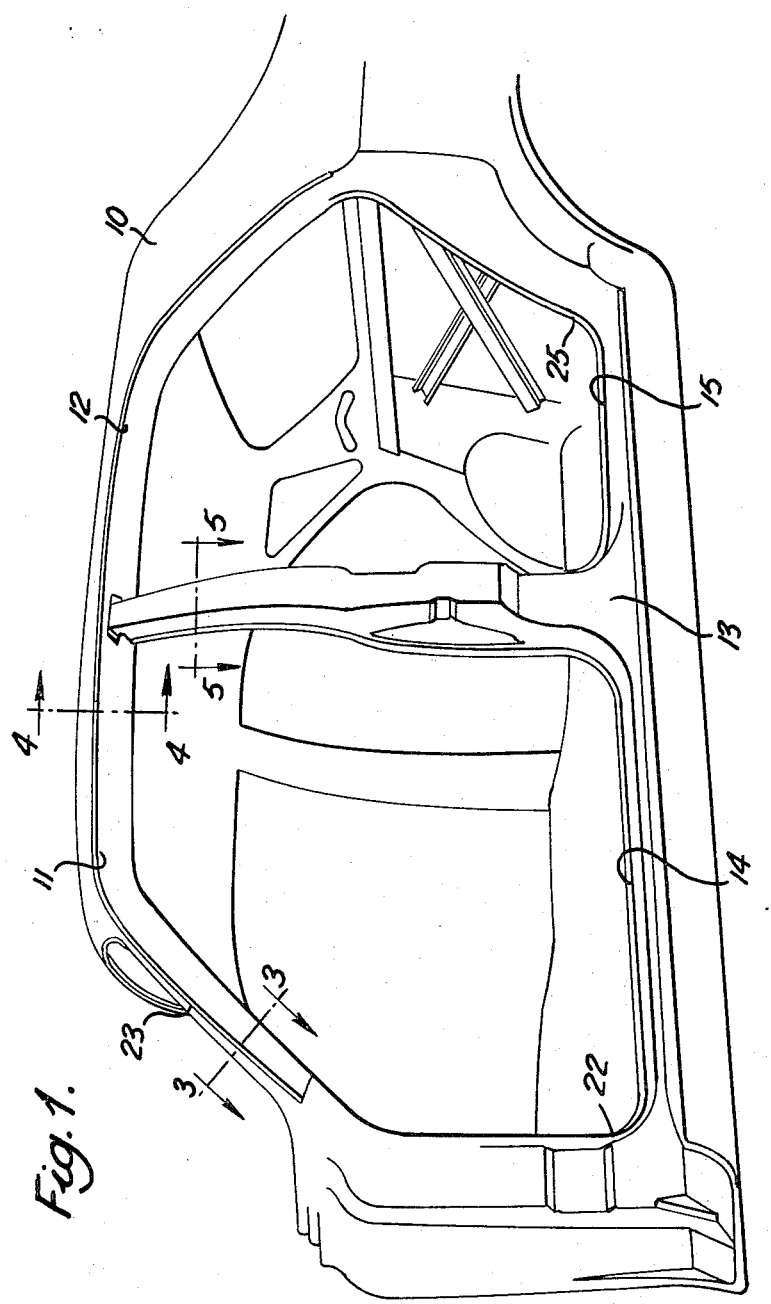

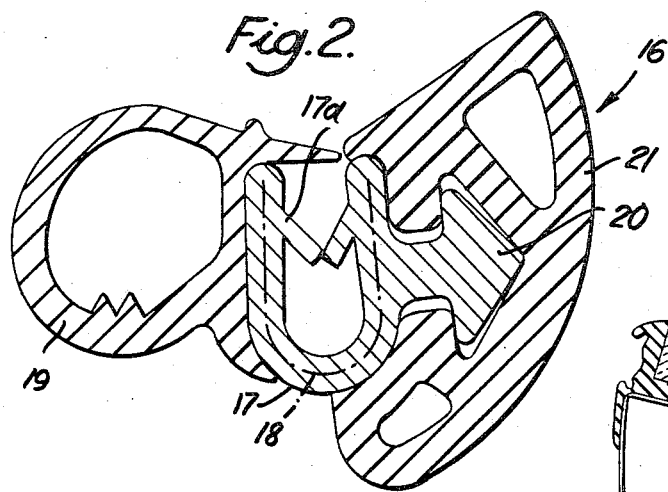
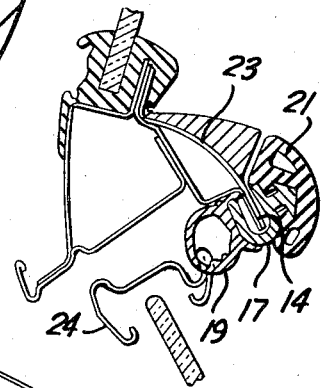
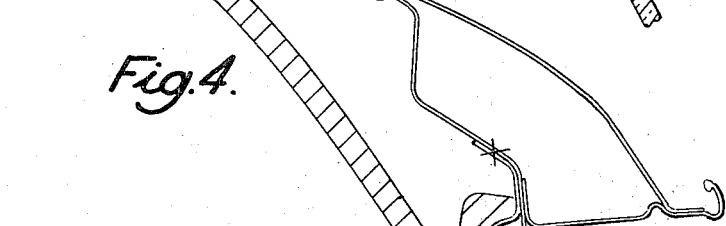
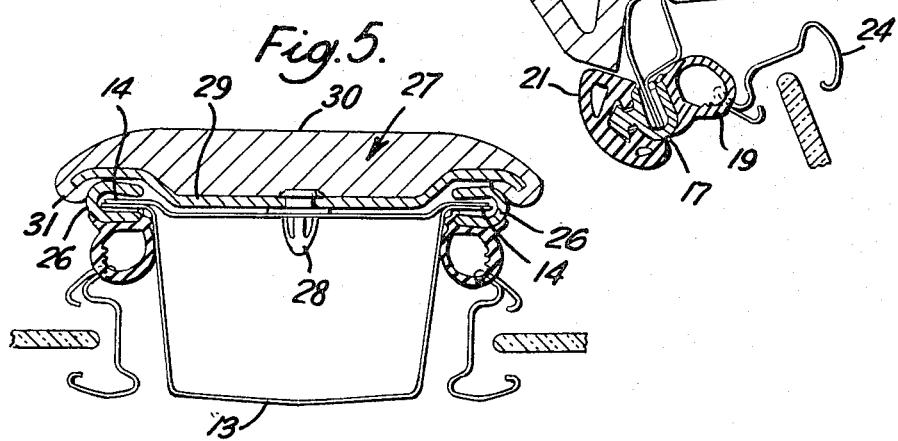

3,797,857

TRIM STRIPS FOR VEHICLE DOOR OPENINGS

BACKGROUND OF THE INVENTION

1. Field of the Invention

The invention relates to trim strips for fitting to a flange encircling the inner periphery of a vehicle door opening.

2. Description of the prior art

Hitherto trim strips for the flange encircling the inner periphery of a vehicle door opening have comprised an elongate U-shaped channel to fit on the flange and a resilient door seal member on one side of the channel to form a seal with the vehicle door. Such trim strips suffered from the disadvantage that the channel provided little or no protection for a vehicle occupant against injury on the flange.

SUMMARY OF THE INVENTION

This invention provides a trim strip for a vehicle door opening comprising an elongate U-shaped channel for engaging around a flange on the inner periphery of the door opening, a resilient door seal member secured to the outer side of one limb of the U and an elongate resilient pad extending along and secured to the outer side of the other limb of the U-shaped channel.

BRIEF DESCRIPTION OF THE DRAWINGS

FIG. 1 is a perspective view of part of a motor vehicle body;

FIG. 2 is a sectional view through a trim strip for the door openings on the vehicle body;

FIG. 3 is a section on the line 3—3 of FIG. 1;

FIG. 4 is a section on the line 4—4 of FIG. 1; and

FIG. 5 is a section on the line 5—5 of FIG. 1.

DESCRIPTION OF THE PREFERRED EMBODIMENT

Referring firstly to FIG. 1 of the drawings there is shown a vehicle body 10 each side of which has front and rear door openings 11 and 12. A door post 13 is provided between the openings. An inturned flange 14 is formed around the inner periphery of each front door opening adjacent the inside of the vehicle and a similar flange 15 is formed around the inner periphery of each rear door opening.

Referring now to FIG. 2 of the drawings there is shown a trim strip 16 which is mounted on portions of the flange 14 of each door opening. The trim strip comprises a U-shaped channel 17 which is moulded in polyvinyl chloride (PVC) and incorporates a strip metal reinforcement 18 which holds the channel in the U-shaped form shown. On the inside of the channel towards the open end of the channel there are two flaps 17a integral with the two walls of the channel which are inclined towards the base of the channel. When the channel is inserted on the flange 14 the flaps 17a grip the flange to prevent the channel from being dislodged from the flange.

Secured to the outer periphery of one side of the channel is a hollow resilient door seal 19. The outer periphery on the other side of the channel is formed with an integral barb 20 extending along the length thereof. An elongate resilient plastics pad 21 is formed with a J-shaped recess in one side thereof to embrace said other side of the channel and a part of the base thereof. The pad is further formed with a recess which is similar in cross-section to the barb 20 to receive the barb and thereby retain the pad 21 on the channel. The pad 21 is formed by extrusion in PVC.

The trim strip illustrated in FIG. 2 of the drawings extends around the flange 14 of the front door opening from the location 22 adjacent the lower end of the forward edge of the door opening, up the forward edge and along the upper edge up to the door post 13.

FIG. 3 of the drawings is a section through the vehicle body along the forward edge of the front door opening at the windscreen pillar 23. The drawing shows part of the vehicle front door 24 engaging the door seal 19. It will be seen that the resilient pad 21 overlies the channel 17 and flange 14 on the inside of the door opening and thus protects an occupant of the vehicle from impact on the channel and flange.

In the rear opening 12 of the vehicle body the trim strip illustrated in FIG. 2 extends along the flange 15 from the door post 13 along the upper and rearward edges of the opening down to the location 25. A single resilient pad 21 is provided for the trim strips on both the front and rear openings and the pad 21 extends across the interior panel of the door post 13 at the upper end of the door post.

A different form of trim strip is applied to the remaining parts of the flanges 14 and 15 of the front and rear door openings, the barb 20 and pad 21 of the strip 16 being omitted. The strip is otherwise identical to that of FIG. 2. The modified strip is illustrated in FIG. 5 of the drawings which is a section through the door post 13 and the modified strips are indicated at 26. A padded trim panel 27 is secured on the inside of the door post 13 by snap fasteners 28 and the edges of the trim panel 27 overlie the strips 26 along the forward and rearward edges of the door post. The trim panel 27 comprises a metal or hardboard backing 29 with a resilient foam padding 30 extending over the outwardly presented face and around the edge portions as indicated at 31. The padding may have an integral impervious skin or may be covered by a separate sheet of trim material.

The strip 26 for the forward opening extends down the door post 13 from the upper end thereof where the channel is mitred and butt welded to one end of the channel 17 and then forwardly along the lower end of the opening to approximately the point 22 where it is butt welded to the other end of the channel 17. In the rearward opening 12 the strip 26 starts at the upper end of the door post 13 where it is mitred and butt welded to one end of the channel 17 and extends downwardly to the lower end of the post and thence along the lower edge of the opening approximately to the point 25, where it is butt welded to the other end of the channel 17. The door seal portions of the above joints are secured together by adhesive.

Similar trim strips are applied to the forward and rearward openings on the other side of the vehicle.

I claim:

1. A trim strip for a vehicle door opening comprising an elongate U-shaped channel having side walls connected by a base for mounting on the flange on the inner periphery of the door opening, an elongate resilient door seal member extending along and secured to one side wall of the channel, an elongate resilient pad which extends along the other side wall of the channel, the pad having a j-shaped recess in one side thereof which embraces said side wall of the channel, and at least a part of the base portion of the channel, a projecting arrow-shaped element formed integrally on said other side wall of the channel and a complementary arrow-shaped recess in the adjacent face of the pad in which said element engages to hold the pad on the channel.

2. A trip strip as claimed in claim 1 wherein the pad is an extrusion formed from resilient P.V.C. plastics.

3. A trip strip as claimed in claim 1 wherein the channel is a plastics extrusion.

4. A trim strip as claimed in claim 1 wherein the channel has a U-shaped core formed in spring metal and embedded within the thickness of the channel wall for pressing the channel limbs into gripping engagement with a flange.

5. A trim strip as claimed in claim 1 wherein the seal is adhered to the channel.

6. A trim strip as claimed in claim 1 wherein the seal comprises a hollow tube having a base secured to the channel.

* * * * *